United States Patent [19]

Cunningham et al.

[11] 4,031,602

[45] June 28, 1977

[54] METHOD OF MAKING HEAT TRANSFER TUBE

[75] Inventors: James L. Cunningham; Bonnie J. Campbell, both of Decatur, Ala.

[73] Assignee: UOP Inc., Des Plaines, Ill.

[22] Filed: Sept. 14, 1976

[21] Appl. No.: 722,922

Related U.S. Application Data

[62] Division of Ser. No. 681,006, April 28, 1976.

[52] U.S. Cl. .................. 29/157.3 AH; 29/157.3 B; 29/157.3 A; 165/179
[51] Int. Cl.² ........................................ B23P 15/26
[58] Field of Search ............ 29/157.3 AH, 157.3 C, 29/157.3 B, 157.3 A, 157.3 R; 165/179

[56] References Cited

UNITED STATES PATENTS

| 2,550,965 | 5/1951 | Brown, Jr. ................... 29/157.3 B |
| 3,753,364 | 8/1973 | Runyan et al. ............ 29/157.3 AH |

*Primary Examiner*—C.W. Lanham
*Assistant Examiner*—V. Rising
*Attorney, Agent, or Firm*—James R. Hoatson, Jr.; Barry L. Clark; William H. Page, II

[57] ABSTRACT

Improved heat transfer tube has radial longitudinal fins on a central core and radial transverse fins on its exterior surface. The composite tube is made by the steps of inserting a longitudinally finned core member inside a smooth surfaced outer tube and then subjecting the outer tube to an external finning operation which produces external fins on the tube while reducing the internal tube diameter of the tube sufficiently that the tube will be firmly mechanically bonded to the finned core member.

4 Claims, 7 Drawing Figures

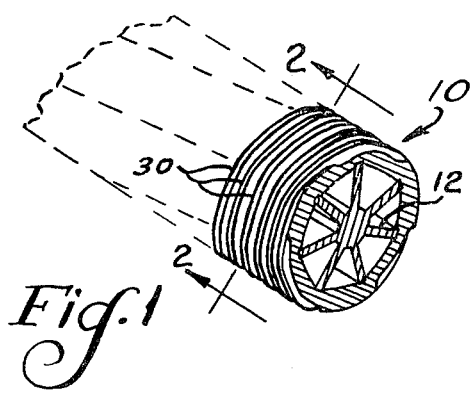
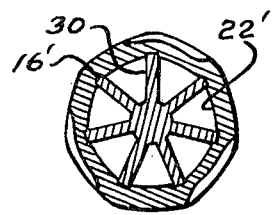
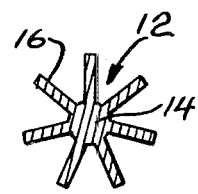
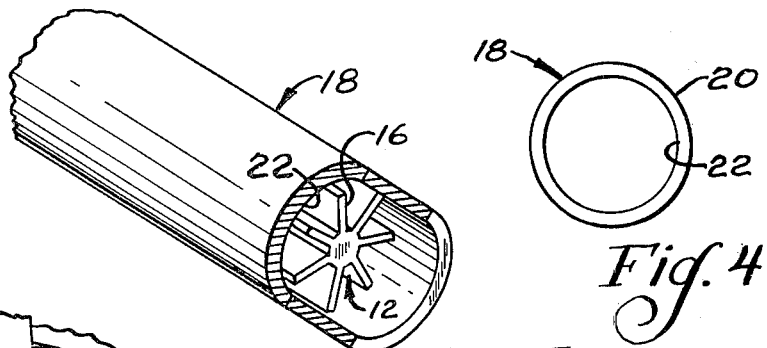
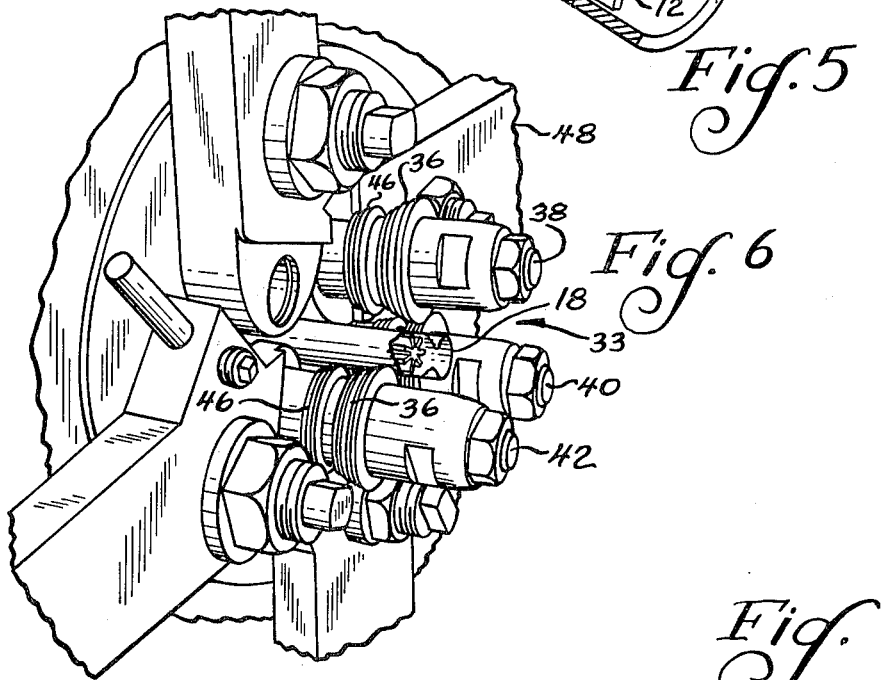
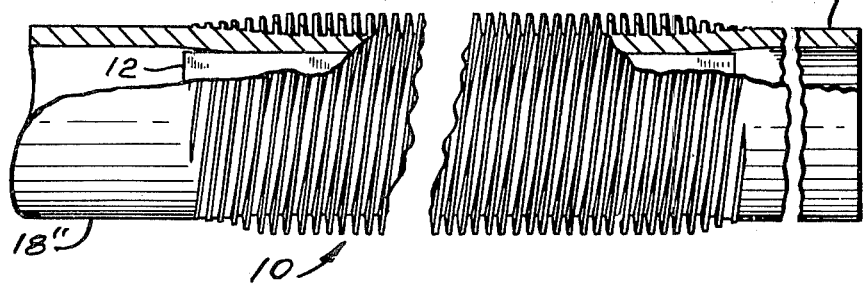

METHOD OF MAKING HEAT TRANSFER TUBE

This is a division of application Ser. No. 681,006, filed Apr. 28, 1976.

BACKGROUND OF THE INVENTION

This invention relates to heat transfer tubes and particularly to tubes which have increased internal surface area as compared to plain tube. U.S. Pat. Nos. 2,960,114 and 3,696,863 each disclose a composite assembly comprising a tube and an externally ribbed or finned insert core and discuss the desirability of providing such a core for enhancing the internal heat transfer coefficient of a tube in certain refrigeration applications. The earlier of the aforesaid patents teaches the locking of the inside tube wall and the fins on the core in tight mechanical relationship by means of longitudinal flutes formed in the smooth external pipe surface in the region between adjacent pairs of internal fins. The later patent teaches that a ribbed or finned insert core can be placed inside an outer tube which has been previously externally finned. The core is then mechanically bonded to the previously finned outer tube by grooving the annular, transversely arranged external fins in a general longitudinal direction at a plurality of locations around the circumference of the tube. The grooving serves to divide each annular fin into a plurality of separate fins in a common plane.

SUMMARY

It is among the objects of the present invention to provide an improved, externally finned heat transfer tube and a method of making same wherein a tube having an outer smooth surface is finned and mechanically locked to a coaxially positioned finned insert in a single operation using conventional finning equipment.

In the preferred method of the present invention, a finned insert, usually formed of aluminum, is loosely placed inside a length of tubing, usually copper. The tubing is then finned in a known manner by fin forming tools, such as the disc type tools disclosed in U.S. Pat. No. 3,383,893 whose subject matter is incorporated by reference herein. Since the ribs or fins of the insert support the inner tube wall at a plurality of locations, the mandrel pin which is normally used during tube finning to prevent the tube wall from collapsing can be omitted. The radial inward pressures applied to the tube by the finning discs serve to reduce the internal diameter of the tube and force its inner wall into contact with the outer tips of the ribs or fins on the insert. Preferably, the finning pressures are sufficient to cause the tips of the insert ribs to become partially embedded in the inner wall of the tube. The tube is also lengthened during the finning process.

BRIEF DESCRIPTION OF THE DRAWINGS

FIG. 1 shows a fragmentary perspective view of a tube in accordance with the present invention;

FIG. 2 is an end cross sectional view taken on line 2—2 of FIG. 1;

FIG. 3 is an end view of an insert member;

FIG. 4 is an end view of a tube member;

FIG. 5 is a partially broken away perspective view showing the insert of FIG. 3 and the tube of FIG. 4 after they have been telescopically assembled to each other;

FIG. 6 is a partially broken away perspective view of a finning machine (with one arbor removed for clarity) which can be used to externally fin the assembly of FIG. 5; and FIG. 7 is a side view showing the insert and tube assembly of FIG. 5 following its partial passage to the right through the finning apparatus of FIG. 6.

DETAILED DESCRIPTION

FIG. 1 shows an improved heat transfer tube, in particular a chiller tube, made in accordance with the present invention. The improved tube indicated generally at 10 comprises an inert portion indicated generally at 12 (FIG. 3) which is preferably formed of an aluminum alloy such as type 6063 and extruded into a shape comprising a core portion 14 having a plurality of ribs or fins 16 extending radially outwardly therefrom. Surrounding the insert member 12 is a tubular member indicated generally at 18 (FIG. 4) which initially has a smooth outer surface 20 and a smooth inner surface 22. To produce the finished finned tube 10, the insert member 12 is placed inside the tube 18 so as to be spaced from the ends of the tube 18 as shown in FIG. 5. The assembly of FIG. 5 is then placed in a finning apparatus such as the three arbor structure disclosed in the aforementioned U.S. Pat. No. 3,383,893 or in the four arbor apparatus 33 (one arbor has been omitted for clarity) shown in FIG. 6.

The finning apparatus 33 includes two sets of variable diameter finning discs. The final sets of discs 36 are positioned outboard of the skewed axis arbors 38, 40 and 42 while the initial sets of discs 46 are positioned inboard of the final discs 36 on the same arbor. The arbors are positioned on a plurality of cam arms 48 for movement toward and away from the axis of the tube 18. The assembly shown in FIG. 5 is transformed into the shape shown in FIG. 1 by being fed from left to right through the apparatus 33. In order to provide unfinned plane end portions 18', 18" on the tube, as shown in FIG. 7, the finning discs 36, 46 are not moved into the tube 18 until a suitable length of plane end tube 18' is moved past them. At this point, the final discs 36 are brought slowly into contact with the work until they are at their final depth of penetration. From this point onward the initial finning discs 46 will proceed to engage the smooth tube portions proceeding from the left. When fins have been formed to the desired axial length the cam arms 48 are rotated in order to cause the finning discs 36, 46 to withdraw from the workpiece and leave the trailing end of the tube 18" with a smooth unfinned surface.

Although finning is usually done with a mandrel bar inside the tube to resist the tremendous forces applied by the finning discs we have found that it is possible to utilize the insert member 12 as a mandrel. Since insert 12 can only resist forces applied radially inwardly along its ribs 16, the inner tube wall 22' tends to assume a straight profile between adjacent fins 16. Naturally, the outside cross section of the heat exchange member 10 also tends to assume a similar shape so that it has a somewhat polygonal configuration. Preferably, the fins 30 are formed to a sufficient depth to cause enough pressure to be applied to the tube 18 to cause its internal diameter to be reduced to a dimension smaller than the outer diameter of the fin tips 16' on the insert member 12. This diameter reduction causes the tube wall to move radially inwardly of the fin tips sufficiently to cause the fin tips 16' to be embedded in the inner tube wall 22'. This embedment provides a very firm locking of the insert to the tube and enhances the transfer of heat between the insert and the tube.

The forces produced by the finning operation normally induces a twist in the tube being finned. Naturally, the twisting of the tube will cause a generally indentical twisting of the insert member 12. Depending upon the amount of twist or lack thereof desired in the insert portion of the final product, it is possible to pretwist the insert in one direction or another or leave it straight before it is assembled inside the tube.

From the preceding description one can appreciate that the method of our invention enables a finned insert tube to be made in a single finning operation rather than require the use of two operations as in the aforementioned prior art patent wherein the tube was finned in a first operation and then additional grooving operations were necessary to provide a locking of the insert to the tube. Furthermore, our one-step operation is less costly and can be done on conventional finning equipment rather than require additional equipment. Finally, the continuous pressure applied during finning causes a much firmer engagement between the tube and insert fin than is possible by longitudinally grooving an already finned tube. This tighter bonding enhances heat transfer from the ribs of the insert to the metal body of the tube and thus increases the overall efficiency of the tube.

We claim as our invention:

1. A method of making a heat transfer tube having inner and outer fins comprising the steps of inserting a core member having a plurality of radially extending longitudinal fins inside a smooth surfaced cylindrical tube and subjecting at least a portion of the outside surface of the composite assembly to a plurality of finning tools so as to produce external fins on the tube and reduce its internal diameter to a dimension less than the external diameter of the finned core member.

2. The method of claim 1 wherein said external fins are helically arranged and generally transverse to the axis of the tube.

3. The method of claim 1 wherein sufficient radial force is applied to the tube during the finning operation to cause the tube wall to tend to become straight, in transverse axial cross-section, in those portions of its circumference which are located between the longitudinal fins on said core member.

4. The method of claim 3 wherein said radial force is sufficient to cause the tips of said longitudinal fins to become partially embedded in the inner wall surface of said tube.

* * * * *